United States Patent [19]

Tews et al.

[11] 4,148,989
[45] Apr. 10, 1979

[54] CROSSLINKING POWDER LACQUERS OF POLYESTERS

[75] Inventors: Günter Tews; Helmut Wulff; Gerhard Schade, all of Witten, Fed. Rep. of Germany

[73] Assignee: Dynamit Nobel Aktiengesellschaft, Troisdorf Bez. Koeln, Fed. Rep. of Germany

[21] Appl. No.: 776,580

[22] Filed: Mar. 11, 1977

[30] Foreign Application Priority Data

Mar. 17, 1976 [DE] Fed. Rep. of Germany ....... 2611117

[51] Int. Cl.$^2$ ..................... C08G 63/70; C08G 63/76
[52] U.S. Cl. ................... 528/177; 528/195; 528/273; 528/296; 528/307; 528/309
[58] Field of Search ................ 260/47 C, 75 T; 528/273, 177, 195, 296, 307, 309

[56] References Cited

U.S. PATENT DOCUMENTS

| | | | |
|---|---|---|---|
| 2,945,840 | 7/1960 | Roberts et al. | 260/75 |
| 3,904,623 | 9/1975 | Shay et al. | 260/249.6 |
| 3,935,169 | 1/1976 | Reen | 260/75 T |
| 3,948,834 | 4/1976 | Brussmann et al. | 260/27 R |
| 4,016,330 | 4/1977 | Laganis | 428/379 |

*Primary Examiner*—Lester L. Lee
*Attorney, Agent, or Firm*—Sprung, Felfe, Horn, Lynch & Kramer

[57] ABSTRACT

A powder lacquer composition comprising a hydroxyl group containing polyester resin which is solid at room temperature and, as a crosslinking agent, a titanium chelate which is solid at room temperature.

16 Claims, No Drawings

CROSSLINKING POWDER LACQUERS OF POLYESTERS

BACKGROUND OF THE INVENTION

1. Field of the Invention

This invention relates to heat setting powder lacquers. More especially this invention relates to heat setting powder lacquers comprising branched hydroxyl group containing polyester resins and titanium chelates. The heat setting powder lacquers of the present invention comprise branch hydroxyl group containing polyester resins which are solid at room temperature and titanium chelates which are also solid at room temperature. The powder lacquer composition can also contain pigments, leveling agents and/or conventional additives.

2. Discussion of the Prior Art

Powder lacquers made of branched polyester resins containing hydroxyl groups and melting above about 80° C., and isocyanates capped with phenol, ε-caprolactam or other blocking agents as crosslinking agents, are known; cf. K. Weigel, "Polyester-Pulverlacke und ihre Verwendung im Lichtmetallbau," Fette, Seifen, Anstrichmittel 76 (1974), 170–174. These can be applied to the substrate by the known electrostatic powder spraying process or the also known fluidized bed sintering process, or also by dip lacquering from the melt, and they can be set by heating at temperatures above 130° C., preferably above about 150° to about 210° C. to form level lacquer films which are resistant to chemical and physical stresses.

However, appreciable amounts of the capping agents used for the blocking of the isocyanates are liberated in these processes, thereby polluting the environment.

When known powder lacquers made from hydroxyl-group-containing polyester resins on the one hand and melamine or benzoguanamine resins on the other hand, are crosslinked by heating in the above-stated temperature range, cleavage products are released which can pollute the environment. In addition, such powder lacquers do not have sufficient shelf life at 40° to 50° C.

The setting of the powder lacquers prepared from a polyester resin component containing hydroxyl groups and one containing carboxyl groups, which are known through German "Auslegeschrift" No. 1,913,923, requires temperatures of 220° C. and baking times of at least 15 minutes, which is uneconomical.

The powdered, heat-setting coating agents known through German "Auslegeschrift" No. 1,519,155, composed of polyesters containing hydroxyl groups and pyromellitic acid dianhydride (PMDA) also produce, after at least 30 minutes at 220° C., coatings of low gloss. As much as 20 wt.-% of PMDA, with respect to the polyesters, is required.

Lastly, it is also known to harden hydroxyl-group-containing polyesters which are suitable as binding agents for powder lacquers by baking them with approximately 4 wt.-% of tetramethyltitanate, commercially known as VERNETZER MT. For this purpose, however, at least 15 minutes at 240° C. are required, and the lacquer films obtained have Lange gloss ratings of no more than 85.

It is an object of this invention therefore to provide a powder lacquer composition which is solid at room temperature and which has an acceptable shelf life at 40° C. to 50° C. and which under the conditions of use does not release pollutants to the environment. It is a further object of this invention to provide a powder lacquer composition which can be applied to substrates at temperatures well below 240° C. over a short period of time to provide lacquer films having Lange gloss ratings of at least 100.

SUMMARY OF THE INVENTION

In accordance with the objects of this invention there is provided a powder lacquer composition comprising a branched hydroxyl-group-containing polyester and, as a crosslinking agent, a titanium chelate. Preferably, the titanium chelate has a melting point between about 50° and 110° C. for such chelates are especially suitable. The powder lacquer composition of the present invention can contain if desired pigments, leveling agents and conventional additives. The branched hydroxyl-group-containing polyesters of the invention generally are solid at room temperature as are the titanium chelate crosslinking agents.

The subject matter of the invention is therefore powder lacquers which can be hardened by heating, based on branched, hydroxyl-group-containing polyester resins, and containing alkyl titanates which are solid at room temperature as crosslinking agents, plus, if desired, pigments and/or leveling agents and/or conventional additives, which are characterized by the fact that the crosslinking agents are titanium chelates which are solid at room temperature.

The high-melting, branched polyester resins contained in the powder lacquers of the invention are prepared in a known manner by polycondensation from polybasic carboxylic acids or their esterifiable derivatives and from polyvalent alcohols, preferably by condensation in the melt, the starting materials being transesterified or esterified with one another in the presence, if desired, of conventional catalysts.

Examples of polybasic aromatic, cycloaliphatic or aliphatic carboxylic acids are terephthalic acid or its dimethyl ester, isophthalic acid, phthalic acid or its anhydride, trimellitic acid and pyromellitic acid or its anhydrides, tetrahydrophthalic acid, hexahydrophthalic acid or its anhydrides, adipic acid, and sebacic acid.

To a secondary degree, monobasic carboxylic acids, such as, for example, benzoic acid or its methyl ester, p-toluylic acid, p-tert.-butylbenzoic acid, 2-ethylhexanic acid, or isononanic acid can also be used, making allowance for the fact that larger contents of aliphatic carboxylic acids lower the softening point of the polyester resin in a known manner.

Suitable polyvalent alcohols are pentaerythritol, trimethylolethane, trimethylolpropane, glycerin, trishydroxyethylisocyanurate, ethylene glycol, propanediol-1,2, neopentyl glycol (2,2-dimethylpropanediol-1,3), butanediol-1,3, butanediol-1,4, hexanediol-1,6, cyclohexanedimethanol (1,4-dihydroxymethylcyclohexane), ethoxylated bisphenol A (2,2-bis-[4,4'-hydroxyethoxyphenyl]-propane), and hydrogenated bisphenol A (2,2-bis-[4,4'-hydroxycyclohexyl]-propane). Here, too, monovalent alcohols, such as benzyl alcohol and 2-ethylhexanol, for example, can be used to a subordinate degree, if the selection of the other raw materials renders this necessary or makes it possible.

The molar ratio of the raw materials is in this case selected in a known manner such that a sufficient excess of the hydroxyl-group-containing components over the COOH-group-containing components is assured, so that polyester resins will result which contain mostly hydroxyl groups, and have hydroxyl numbers between about 50 and about 150, preferably between 80 and 130 mg KOH/g. The acid number of the polyester resins obtained can be between 0 and about 15 mg KOH/g.

The polyester resins contained in the powder lacquers of the invention are colorless to yellowish solids, which are brittle and easily ground at room temperature, and whose softening point is in the temperature range between about 70° and about 105° C., measured in accordance with DIN Standard 53,180.

The titanium chelates to be used in accordance with the invention as crosslinking agents are derived from one, or in some cases several, branched 1,3-diols as chelating agents, with the use, in some cases, of one or more other diols and/or univalent alcohols. They correspond to the general formula

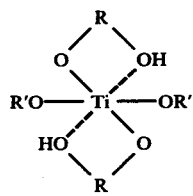

wherein R is a propylene moiety which is substituted asymmetrically by at least one alkyl group. The alkyl substituents can be similar or different, straight-chained and/or branched. They can contain, for example, up to 10 carbon atoms. Preferably they contain up to 3 carbon atoms. R' represents hydrogen, alkyl or hydroxyalkyl, especially those groups having up to 10 carbon atoms, more preferably up to about 6 carbon atoms. R' also represents a cycloalkyl or hydroxy-cycloakyl radical, especially a cycloalkyl or hydroxycycloalkyl radical having up to 8 carbon atoms, preferably having 8 carbon atoms. R' also represents an aralkyl or hydroxyaralkyl radical having up to 12 carbon atoms in the aryl portion of the moiety and up to 7 carbon atoms in the alkyl portion of the moiety. The aforementioned moieties, preferably alkyl moieties, can contain one or more hetero atoms such as oxygen, sulphur or nitrogen.

Such chelates are described, for example, in Houben-Weyl "Methoden der organischen Chemie", 4th Ed., vol. VI/2, pp. 33 sqq. They are prepared in a simple manner by the reaction of the alcoholates of titanium and low univalent alcohols, such as, for example, tetra-n-butyl or tetra-isopropyl-titanate with 2 to 4 moles of the branched 1,3-diols used as chelating agents in accordance with the invention per mole of titanium alcoholate, at elevated temperature, followed by the distilling out of the univalent alcohol.

1,3-diols suitable for the preparation of solid titanium chelates are, for example, those having 2 to 3 alkyl substituents, samples being 2,2,4-trimethylpentanediol-1,3, 2-methylpentanediol-2,4, 2-ethylhexanediol-1,3, 2-methylpentanediol-1,3, 2-methyl-5-propylheptanediol-1,3, alone, or mixtures of the individual components. The concomitant use of other suitable diols or diol mixtures, such as ethylene glycol, butanediol-1,4, hexanediol-1,6, cyclohexanedimethanol-1,4, bis-(2-hydroxyethoxy)-diphenylolpropane, p-xylyleneglycol and/or in mixture with suitable univalent alcohols, such as 2-ethylhexanol and/or benzyl alcohol, is also possible. Especially suitable and therefore preferred as a chelating agent is 2,2,4-trimethylpentanediol-1,3, alone or together with cyclohexanedimethanol-1,4, bis-(2-hydroxyethoxy)-diphenylolpropane, hexanediol-1,6 or butanediol-1,4. It is desirable first to mix the 1,3-diols used for the chelating with the titanium alcoholates and then, after the exothermic reaction has ceased, to add any additional diols. The univalent alcohols that have formed are distilled out by heating the reaction mixtures, it being desirable to apply a vacuum at the end.

The solid titanium chelates thus prepared are mixed with suitable polyester resins containing mostly hydroxyl groups, together, if desired, with pigments and conventional lacquer adjuvants such as leveling agents, for example, and homogenized in a known manner, by means of a heated kneader or an extruding machine, at temperature up to about 120° C. The composition thus obtained is then finely ground in suitable mills, sifted if necessary, and applied electrostatically to the substrates to be coated. By baking on for 10 to 15 minutes at 180° to 200° C., very glossy, elastic and solvent-resistant lacquer films are obtained, while cleavage products do not escape to any appreciable extent.

Generally speaking the hydroxyl-group-containing polyesters of the invention contain between 3 and 20 percent by weight preferably between 5 and 10 percent by weight titanium chelate, based upon the weight of the polyester. The powder lacquer compositions of this invention can also contain an solid alkyltitanate such as tetramethyltitanate. Where an alkyltitanate is included in the powder lacquer composition it is generally present in an amount between 1 and 5 percent by weight preferably between 0.5 and 2 percent by weight.

In order to more fully illustrate the nature of the invention and the manner of practicing the same the following examples are presented.

EXAMPLES

The invention will be further explained with the aid of the following examples.

Examples of the Preparation of the Polyester Resins

EXAMPLE 1

1164 g of dimethylterephthalate (DMT), 268 g of trimethylolpropane (TMP), 341 g of ethylene glycol (EG) and 2.7 g of potassium tert.-butylate are heated with stirring and with the introduction of inert gas until methanol begins to form, and the methanol is distilled out through a packed column. The temperature of the reaction mixture is gradually increased to 230° C. in accordance with the rate of distillation, and is maintained at that level until at least 95% of the amount of methanol to be expected has been distilled out and no more methanol passes over. The reaction mixture is then cooled to 200° C. and condensed in vacuo, with the removal of ethylene glycol by distillation, to a reduced viscosity of 0.25 to 0.27 (measured on a 1% solution in 60 weight-parts of phenol plus 40 weight parts of 1,1,2,2-tetrachloroethane).

The nearly colorless hydroxyl-group-containing polyester resin obtained, which solidifies like glass, has an acid number of under 1 mg KOH/g, a hydroxyl number of 145 mg KOH/g, measured in accordance with DIN 53,183, and a softening point of 86° C., measured in accordance with DIN 53,180.

EXAMPLE 2

1398 g of DMT is added portion-wise, with stirring, and inert gas, to a mixture, heated at 100° to 130° C., of 193 g of TMP, 125 g of neopentylglycol (NPG), 403 g of EG, 0.85 g of tetrabutyl titanate and 0.85 g of zinc acetate dihydrate, and transesterified as described in Example 1 by further heating up to 240° C. The melt, after cooling to 200° C., is then condensed in vacuo, with the removal of excess diols by distillation, to a reduced viscosity of 0.25. A virtually colorless polyester resin solidifying like glass is obtained, which has the following characteristics: Acid number less than 1, hydroxyl number 98 to 100, softening point 93°–94° C.; the characteristics were measured as in Example 1.

Example of the Preparation of Titanium Chelates

EXAMPLE 3

1168 g of 2,2,4-trimethylpentanediol-1,3 (8 moles) are added in portions, with stirring, to 568 g (2 moles) of tetraisopropyltitanate, whereupon the reaction mixture heats exothermally to about 80° C. After refluxing for 4 hours, the isopropanol is distilled out through a packed column, in a vacuum at the end. The residue solidifies upon cooling to a solid, white mass with a melting range pursuant to DIN 53,181 of 106° to 108° C., and can be used without further refinement as a crosslinking agent. Calculated titanium dioxide content: 12.74%; found: 12.89%.

EXAMPLE 4

584 g (4 moles) of 2,2,4-trimethylpentanediol-1,3 is added to 680 g of tetra-n-butyltitanate (2 moles) at 50° C., with stirring, and 576 g (4 moles) of cyclohexanedimethanol-1,4 is added to the clear melt. The butanol that forms is distilled out through a packed column at a vacuum that is gradually increased to 200 Torr. The cooled residue is a brittle, white, crystalline mass with a melting range pursuant to DIN 53,181 of 72° to 79° C. Calculated titanium dioxide content: 12.8%, found: 12.6%.

The additional titanium chelates contained in the following table were prepared in the same manner.

| Ex. No. | Composition in moles | Melting Range DIN 53,181 | % TiO$_2$ Calc. | Found | Reactivity test, sec. |
|---|---|---|---|---|---|
| 5 | 2 TMPD 2 EG | 45–65 | 17.3 | 16.5 | 100 |
| 6 | 2 TMPD 2 BD-1,4 | 59–72 | 15.5 | 14.0 | 120 |
| 7 | 2 TMPD 2 HD-1,6 | 62–75 | 14.0 | 13.4 | 160 |
| 8 | 2 TMPD 2 DIANOL 22 | 88–99 | 8.4 | 8.3 | 330 |
| 9 | 2 TMPD 2 p-XG | 85–102 | 13.1 | 13.2 | 255 |
| 10 | 4 MPD | 52–92 | 15.5 | 15.6 | 40 |
| 11 | 2 MPD 2 BD-1,4 | 43–75 | 17.3 | 16.4 | 20 |
| 12 | 2 MPD 2 HD-1,6 | 40–49 | 15.5 | 15.1 | 60 |
| 13 | 2 EHD 2 EG | 53–73 | 17.3 | 17.2 | 120 |
| 14 | 2 EHD 2 BD-1,4 | 35–57 | 15.5 | 15.1 | 120 |
| 15 | 2 EHD 2 HD-1,6 | 35–44 | 14.0 | 13.7 | 135 |

Glossary:
TMPD = 2,2,4-trimethylpentanediol-1,3
MPD = 2-methylpentanediol-2,4
EHD = 2-ethylhexanediol-1,3
EG = ethylene glycol
BD-1,4 = butanediol-1,4
HD-1,6 = hexanediol-1,6
DIANOL 22 = bis-(2-hydroxyethoxy)-diphenylolpropane
p-XG = p-xylylene glycol

Reactivity Test

A melt of 95 weight-parts of polyester resin of Example 1 and 5 weight-parts of titanium chelate are stirred for 5 minutes at 110° C. to 115° C., and then cooled and ground. The jelling time is measured of a specimen after it has been sprinkled onto an aluminum block whose surface temperature is 200° C.

Examples of Preparation of Powder Lacquers of the Invention

EXAMPLE 16

A powder lacquer of a particle size under 100μ and mostly 30 to 60μ is prepared by mixing, extruding, grinding and sifting, in a known manner, from 1000 wt.-parts of a polyester resin of Example 1, 80 wt.-parts of a titanium chelate of Example 6, 476 wt.-parts of titanium dioxide pigment and 33 wt.-parts of a commercial leveling agent commonly used in powder lacquers, such as Acronal ® 700 L, for example.

This coating powder is applied by the known electrostatic powder spray method to degreased 0.8 mm thick steel plates ground on both sides, at a voltage of 80 kV, and is baked on for 15 minutes at 200° C.

A very glossy, well leveled, fully crosslinked, adherent and elastic lacquer film is obtained having a gloss value of 128 according to Lange, and a thickness of 50 to 60μ.

EXAMPLE 17

A lacquer powder is prepared and applied in the same manner as described in Example 16, from 1000 weight-parts of a polyester resin of Example 2, 60 weight-parts of a titanium chelate of Example 10, 468 weight-parts of titanium dioxide CL 220 and 32 weight-parts of Acronal ® 700 L.

The 50-micron lacquer film obtained is fully crosslinked, i.e., resistant to methyl ethyl ketone, and has a gloss value of 100 according to Lange 45°.

Comparative Example

A powder lacquer prepared from 580 weight-parts of a polyester resin of Example 1, 23 weight-parts of tetramethyltitanate, 390 weight-parts of KRONOS RNCS titanium dioxide, and 7 weight parts of Acronal ® 700 L, in the manner specified in Example 16, requires 15 minutes at 240° C. in order to yield a fully crosslinked lacquer film. The film, however, has a gloss value of only 80 to 85 according to Lange 45°.

What is claimed is:

1. A powder lacquer composition comprising a branched hydroxy group containing polyester resin which has a hydroxyl number between 50 and 150 mg KOH/g and which is solid at room temperature and 0.3 to 20 percent by weight of a crosslinking agent consisting essentially of a titanium chelate which is solid at room temperature.

2. A powder lacquer composition according to claim 1 wherein the titanium chelate has the formula

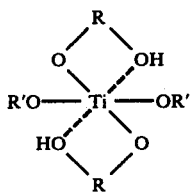

wherein R is a propylene moiety which is substituted asymmetrically by at least one alkyl group and R' is hydrogen, alkyl or hydroxyalkyl, cycloalkyl or hydroxycycloalkyl, aralkyl or hydroxyaralkyl which can contain one or more hetero atoms.

3. A powder lacquer composition according to claim 2 wherein R is a propylene moiety which is substituted asymmetrically by at least one alkyl group having up to 10 carbon atoms, R' is hydrogen, alkyl or hydroxyalkyl with up to 10 carbon atoms, cycloalkyl or hydroxycyloalkyl with up to 8 carbon atoms, aralkyl or hydroxyaralkyl with up to 10 carbon atoms in the aryl group and up to 4 carbon atoms in the alkyl group which can also contain one or more hetero atoms.

4. A powder lacquer composition according to claim 2 wherein the titanium chelate is the reaction product of an alcoholate of titanium and a branched 1,3-diol.

5. A powder lacquer composition according to claim 4 wherein the alcoholate of titanium is tetra-n-butyl titanate or tetra-isopropyl-titanate and the chelate is prepared by reacting the alcoholate of titanium with 2 to 4 moles of a branched 1,3-diol.

6. A powder lacquer composition according to claim 4 wherein the 1,3-diol is a 1,3-diol having 2 to 3 alkyl substituents.

7. A powder lacquer composition according to claim 6 wherein the 1,3-diol is 2,2,4-trimethylpentanediol-1,3, 2-methylpentanediol-2,4, 2-ethylhexanediol-1,3, 2-methylpentanediol-1,3 or 2-methyl-5-propylheptanediol-1,3 or a mixture thereof.

8. A powder lacquer composition according to claim 6 wherein the 1,3-diol is in admixture with another diol.

9. A powder lacquer composition according to claim 8 wherein said other diol is ethylene glycol, butanediol-1,4, hexanediol-1,6, cyclohexanedimethanol-1,4, bis-(2-hydroxyethoxy)-diphenylolpropane or p-xyleneglycol or a mixture thereof.

10. A powder lacquer composition according to claim 9 wherein said other diol is in admixture with an univalent alcohol and said univalent alcohol is 2-ethylhexanol or benzyl alcohol.

11. A powder lacquer composition according to claim 7 wherein the titanium chelate is prepared from 2,2,4-trimethylpentanediol-1,3 alone or together with cyclohexanedimethanol-1,4, bis-(2-hydroxyethoxy)-diphenylolpropane, hexanediol-1,6 or butanediol-1,4.

12. A powder lacquer composition according to claim 1 wherein the titanium chelate is present in an amount between 3% and 20% by weight.

13. A powder lacquer composition according to claim 1 wherein the titanium chelate is present in an amount between 5% and 10% by weight.

14. A powder lacquer composition according to claim 1 wherein the hydroxyl group containing polyester has a hydroxyl number between 80 and 130 mg KOH/g.

15. A powder lacquer composition according to claim 1 wherein the hydroxyl group containing polyester has an acid number between 0 and 15 mg KOH/g.

16. A powder lacquer composition according to claim 1 wherein the hydroxyl group containing polyester has a softening point in the range of about 70 to about 105° C.

* * * * *